Patented Aug. 13, 1935

2,011,496

UNITED STATES PATENT OFFICE 2,011,496

PROCESS FOR THE PRODUCTION OF AN ANTISLIP RUBBER MATERIAL

Josef Otto Lüchinger, Biel, Switzerland, assignor to Azo Aktiengesellschaft, Biel, Switzerland No Drawing. Application March 24, 1932, Serial No. 601,041. In Germany February 12, 1932

7 Claims. (Cl. 106—23)

The present invention relates to anti-slip rubber for covering wheels and the like which prevents, with absolute certainty, vehicles from skidding on slippery surfaces.

It has already been proposed, in the production of such covers, to embed hard substances in the rubber. Such insertions, which have been incorporated with the rubber during the process of vulcanizing the caoutchouc mass, have, however, as a rule, not fulfilled the desired purpose, and have, moreover, resulted in too rapid wearing of the material.

The insertions, consisting of hard substances, in time wander in the rubber, owing to the movement of the wheels, for covering which it is employed. The consequence of this is that the insertions even reach the body of the rubber tires and rub against and destroy the same.

The present invention relates to an anti-slip rubber which is provided with insertions of hard substances and which does not show the aforementioned disadvantages, but on the contrary, owing to its peculiar construction, ensures increased solidity of the running surface of the tire material and also still greater security against slipping.

The invention depends on the new discovery that it is possible so to incorporate insertions of solid bodies with the caoutchouc from which the rubber tires are produced, prior to vulcanizing, that, after the manufacture is completed, movement of the hard substances inwards to the body of the rubber tires is with certainty avoided. The arrangement of the solid substances in the caoutchouc or rubber is effected according to the invention in that, owing to the use of the running surfaces in the movement of the wheels provided with the cover, the hard insertions pass out of the rubber to the outer running surface owing to the pressure of the vehicle, roughen the rubber from the inside and, after they have been completely expelled, leave hollows or pores in the rubber which impart certain suction powers to the same.

Such an embedding of the hard insertion material is effected according to the invention by carefully distributing substances of comparatively great hardness, for example quartz, emery, corundum or the like in a definite finely granulated condition, incorporating the same in definite proportions with the caoutchouc with the aid of a carrier which fixes the granular material in position after incorporation with the caoutchouc, so that any movement within the caoutchouc after vulcanization of the rubber is rendered impossible. Three conditions are necessary for obtaining the desired effect:

(1) A definite size of grain of the hard material to be embedded in a fine state of division which size must not be exceeded.

(2) A definite percentage addition of the granular material incorporated with the rubber, which must not be deviated from in either direction.

(3) The use of a carrier which keeps the material in position after embedding.

With regard to the first condition the hard material, such as quartz, emery, corundum and the like, must not exceed about 1 mm. in size of grain.

With regard to the second condition the finely grained material must be incorporated with the caoutchouc in an amount varying between 10 and 30 per cent. If more than the amount indicated is employed, the final product will be brittle, if less, the anti-slip properties of the finished material will be decreased.

With regard to the third condition the carrier or fixing material consisting of a suitable agent, which is adapted to fix the hard material, for example quartz or the like in the caoutchouc or rubber mass, is applied to the granulated material and dried on the same so that the finely grained quartz mass or the like is coated with a binding agent and, to a certain extent, glazed, so that there is nothing to prevent fine distribution in the caoutchouc of the dried material, which is still in a finely grained form even after being coated with the binding agent.

If the hard material so prepared is uniformly distributed in the caoutchouc mass to be vulcanized in the size of grain and the quantitative proportions indicated, and if the rubber is thereafter finished in the usual manner, the glazing on the granular insertions softens owing to the heat generated by the treatment and becomes again capable of binding. In this way it firmly fixes the insertions in position. A material actually results which is highly elastic but still highly resistant, in which it is impossible for the insertion to wander into the body of the rubber tire and consequently have a disturbing effect thereon, but in which the embedded grains, owing to the pressure of the moving wheels, are gradually pushed outwards. The running surface is thereby roughened and absolute security against skidding afforded. This process is, of course, still further promoted by the gradual wear of the running surfaces.

The process for the production of anti-skid rubber according to this invention may be carried out as follows:

Example

Quartz of about 1 mm. size of grain is cleansed by elutriation and coated with a viscous binding agent which may, for example consist of 150 parts by weight of litharge, and 50 parts by weight of glycerine.

The coating is effected by stirring the quartz into the binding agent. It is dried at a moderate temperature. The resulting finely grained mass covered with a glazing of binding agent is thoroughly sieved and the material thereafter incorporated in the usual manner by means of masticators, rollers or the like, with the caoutchouc in a proportion of about 20 per cent by weight, if desired together with the vulcanizing agents, and finely distributed therein, after which the mixture is worked up in the usual manner into a moulded article.

What I claim is:

1. A tire tread composition formed of resilient yieldable, vulcanized rubber containing distributed particles of abrasive material coated with litharge and glycerine which bonds them to the rubber to prevent migration of the particles into the body of the tire.

2. A tire tread composition formed of resilient, yieldable, vulcanized rubber containing 10 to 30% of distributed particles of abrasive material coated with litharge and glycerine which bonds the particles to the rubber to prevent migration of the particles into the body of the tire.

3. A tire tread composition formed of resilient, yieldable vulcanized rubber containing 10 to 30% of distributed particles of hard material selected from the group consisting of quartz, emery and corundum and coated with litharge and glycerine which bonds them to the rubber to prevent migration of the particles into the body of the tire.

4. A tire tread composition formed of vulcanized rubber composition containing 10 to 30% of distributed particles of hard material selected from the group consisting of quartz, emery, and corundum and coated with a material consisting of three parts litharge and one part glycerine, the particles being bonded to the rubber by said coating material.

5. A process for making a non-skid resilient, yieldable, rubber composition for use as tire treads and the like, which comprises applying a coating of litharge and glycerine to the grains of suitable, hard, granular material, distributing said granular material in unvulcanized caoutchouc, adding a suitable vulcanizing agent to the mixture and subjecting the whole to a vulcanizing process.

6. A process for making a non-skid resilient, yieldable, rubber composition for use as tire treads and the like, which comprises applying a coating of litharge and glycerine to grains of at least one member of the group consisting of quartz, emery and corundum, distributing said quartz, emery and corundum, distributing said granular material in unvulcanized caoutchouc, adding a suitable vulcanizing agent to the mixture and subjecting the whole to a vulcanizing process.

7. A process for making a non-skid resilient, yieldable, rubber composition for use as tire treads and the like, which comprises applying a coating of litharge and glycerine to grains of hard, granular material, drying the same, distributing said coated granular material in unvulcanized caoutchouc, adding a suitable vulcanizing agent to the mixture and subjecting the whole to a vulcanizing process.

JOSEF OTTO LÜCHINGER.